United States Patent [19]

Plee et al.

[11] Patent Number: 4,940,033
[45] Date of Patent: Jul. 10, 1990

[54] METHOD OF OPERATING AN ENGINE AND MEASURING CERTAIN OPERATING PARAMETERS

[75] Inventors: Steven L. Plee, Northborough; Peter Hartman, Worcester, both of Mass.; Jay K. Martin, Madison, Wis.; J. Paul Nolan; Donald J. Remboski, Jr., both of Northborough, Mass.; Richard R. Ross, Shrewsbury, Mass.

[73] Assignee: Barrack Technology Limited, Marlborough, Mass.

[21] Appl. No.: 266,682

[22] Filed: Nov. 3, 1988

Related U.S. Application Data

[63] Continuation of Ser. No. 193,918, May 13, 1988.

[51] Int. Cl.$^5$ .......................... F02D 41/22; F02P 5/14; G01L 23/22
[52] U.S. Cl. .................................. 123/425; 123/435; 123/494; 73/35; 73/116
[58] Field of Search ................ 123/419, 425, 435, 436, 123/494; 73/35, 116, 119 R

[56] References Cited

U.S. PATENT DOCUMENTS

| | | | |
|---|---|---|---|
| 4,358,952 | 11/1982 | Maurer et al. | 73/35 |
| 4,397,283 | 8/1983 | Komaroff et al. | 73/35 |
| 4,413,509 | 11/1983 | Moser et al. | 73/35 |
| 4,419,212 | 12/1983 | Dietz et al. | 73/35 |
| 4,425,788 | 1/1984 | Franke et al. | 73/35 |
| 4,437,334 | 3/1984 | Laurenz | 73/35 |
| 4,444,043 | 4/1984 | Hattori et al. | 73/35 |
| 4,444,169 | 4/1984 | Kirisawa | 123/494 X |
| 4,446,723 | 5/1984 | Böning et al. | 73/35 |

Primary Examiner—Willis R. Wolfe
Attorney, Agent, or Firm—Harness, Dickey & Pierce

[57] ABSTRACT

An internal combustion engine having a luminosity probe and an arrangement for measuring certain parameters such as IMEP, combustion chamber pressure, heat release and the like by measuring luminosity in the chamber and adjusting the running parameters of the engine to obtain the desired luminosity. Also disclosed is an arrangement for maintaining uniformity from cycle to cycle in a given combustion chamber and uniformity combustion in the combustion chambers of a multi-chamber engine.

19 Claims, 1 Drawing Sheet

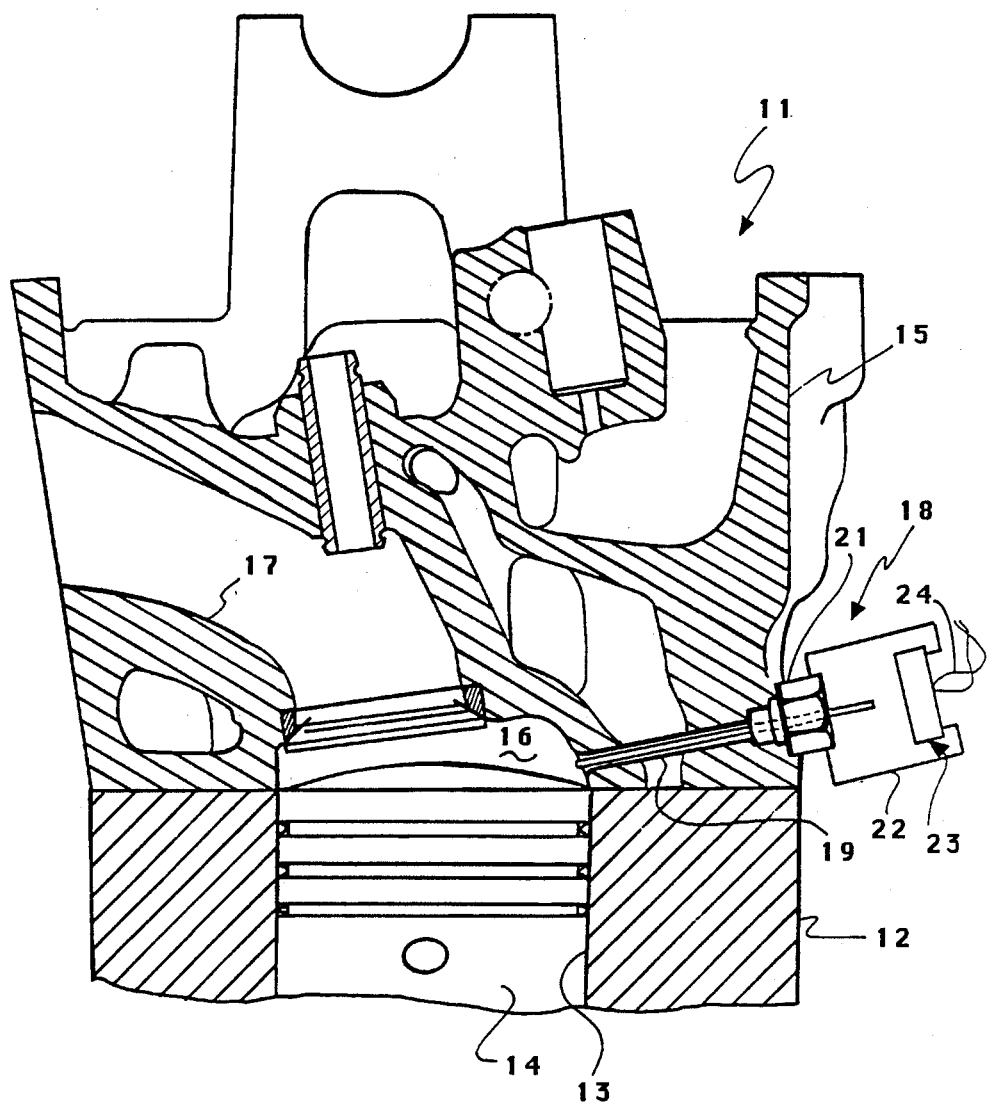

METHOD OF OPERATING AN ENGINE AND MEASURING CERTAIN OPERATING PARAMETERS

CROSS REFERENCE TO RELATED APPLICATION

This application is a continuation in part of our application entitled "Method of Operating An Engine", Ser. No. 193,918, filed May 13, 1988 and assigned to the assignee of this application, still pending.

BACKGROUND OF THE INVENTION

This invention relates to a method of operating an engine and an engine apparatus and more particularly to an improved method and apparatus for operating an engine in response to actual conditions in the combustion chamber during each combustion cycle and for measuring certain operating parameters of the engine on a cycle to cycle basis.

With the modern technology and electronics, many of the components and running conditions of an internal combustion engine can be controlled more accurately than with previous mechanical systems. For example, the control of the fuel/air ratio, spark timing and other adjustable factors of engine operation are greatly facilitated through the use of electronic components and electronic computers. However, in order to accurately sense the running of the engine and the combustion during each combustion cycle, it is necessary to provide a sensor that is directly positioned within the combustion chamber or in proximity to it and which senses the actual combustion conditions in the engine. Most engine controls employ external devices such as oxygen sensors or knock sensors which actually sense only average conditions due to their inherent nature. Also in-cylinder pressure transducers have been proposed for these purposes.

It has been understood that knocking can be determined by an optical sensor that operates within the combustion chamber and which senses the luminosity of the gases in that chamber. A wide variety of knock sensors have been proposed that employ such sensors. However, the inventors have discovered that luminosity in the combustion chamber can indicate a much wider range of running conditions than previously realized.

As has been previously noted, in-cylinder pressure transducers have been proposed for providing signals to be utilized in engine control. This indicates a recognition of the importance of measuring the actual running and operating condition within the individual cylinders. Even though luminosity devices have been well known, it has not been previously recognized that the luminosity device can be employed for measuring other characteristics of the engine. The disadvantage with the use of pressure transducers is that they must exist in a very hostile environment and can provide only limited information. Pressure transducers are very sensitive to temperature and, as is well known, the temperature in the combustion chamber fluctuates widely during engine operation. Hence the pressure signal can be very adversely effected by these temperature changes. In addition, the pressure transducers require the conversion of a pressure signal into an electrical signal and this electrical signal then must be transmitted to a remote location in order to provide the desired information. Obviously, such devices are prone to false readings due to the extraneous electrical noise that can be generated within an engine during its running operation. Furthermore, the amount of information which can be received from such pressure transducers is, as noted, severely limited.

It is, therefore, a principal object of this invention to provide an improved system and method for operating an engine wherein the engine adjustable parameters can be varied in response to actual sensed conditions in the combustion chamber during each combustion cycle.

It is a further object of this invention to provide an engine control system wherein the engine can be controlled in response to actual combustion conditions occurring in the combustion chamber on individual cycles.

Because of the aforenoted averaging tendency of the prior art type of sensors, it is also difficult to determine the existence of cylinder to cylinder or cycle to cycle variation. It is, therefore, a still further object of this invention to provide an improved system for sensing engine operation and sensing and determining cycle to cycle and chamber to chamber variations during running.

In addition to controlling the engine, the control should be predicated upon certain measured parameters of the engine. For example, it is very desirable to be able to obtain and measure such engine running characteristics as maximum cylinder pressure and cylinder pressure in relation to crank angle, maximum heat release and the relationship of heat release to crank angle, air/fuel ratio and indicated mean effective pressure (IMEP) which is in effect the same as measuring engine torque or power. However, it has not been previously possible to measure such values, particularly when the engine is running on a cycle to cycle basis with a simple and yet engine mounted sensor.

It is, therefore, a further object of this invention to provide an improved and simplified arrangement for measuring the aforenoted characteristics of an engine during its running and on a cycle to cycle basis through the use of a simple sensor that is mounted directly on the engine.

A type of engine sensor has been proposed that senses the actual luminosity of the gases within the combustion chamber. A wide variety of patents illustrating and describing the use of such sensors have issued including the following:

U.S. Pat. Nos. 4,358,952
4,369,748
4,377,086
4,393,687
4,409,815
4,412,446
4,413,509
4,419,212
4,422,321
4,422,323
4,425,788
4,468,949
4,444,043
4,515,132

For the most part, these patents disclose arrangements wherein the sensor is utilized to sense only total luminosity and to equate the luminosity signal to a knocking signal.

However and as has been noted, the inventors have discovered that this signal can also be employed to sense a wide variety of other engine running characteristics and it is a further object of this invention to measure these characteristics, use these signals to control the engine parameters to obtain better running and to obtain consistent running from cylinder to cylinder and cycle to cycle.

SUMMARY OF THE INVENTION

This invention is adapted to be embodied in a method of operating an internal combustion engine and an apparatus therefor that has a combustion chamber and means for forming a combustible fuel/air mixture within the combustion chamber. In accordance with this feature of the invention, the luminosity of the gases in the combustion chamber is sensed and the fuel/air ratio is adjusted to maintain the desired luminosity.

In accordance with another feature of the invention, there is provided a method and apparatus of operating an internal combustion engine having a combustion chamber and means for providing a fuel/air mixture within the combustion chamber and for igniting that fuel/air mixture. In accordance with this feature of the invention, the luminosity of the gases in the combustion chamber is measured and the engine running characteristics are adjusted so as to maintain the desired degree of luminosity and the peak pressure rate at the desired crank or output shaft angle.

In accordance with a still further feature of the invention there is provided a method and apparatus for operating an internal combustion engine having a combustion chamber. In accordance with this feature of the invention, the instantaneous pressure within the cylinder is sensed by means other than a pressure transducer and the running characteristics of the engine are adjusted so as to maintain the desired peak pressure in relation to crank angle.

Yet another feature of the invention is adapted to be embodied in a method and apparatus for operating an internal combustion engine having a combustion chamber. In accordance with this feature of the invention, the rate of maximum heat release in relation to crank angle is measured and the engine parameters are adjusted to maintain the desired relationship.

In accordance with still a further feature of the invention, there is provided a method and apparatus for operating an internal combustion engine having a combustion chamber. In accordance with this feature of the invention, the indicated mean effective pressure within the combustion chamber is measured during each cycle of operation of the engine and is adjusted to maintain the desired relationship.

Another feature of the invention is also adapted to be embodied in a method of operating an internal combustion engine having a combustion chamber and means for causing combustion to occur in the combustion chamber. In accordance with this feature of the invention, the luminosity of the gases in the combustion chamber are sensed during each combustion cycle and the engine is adjusted to minimize cyclic variations.

Yet another feature of the invention is adapted to be embodied in a method and apparatus for operating a multi-combustion chamber internal combustion engine that includes means for effecting combustion in each of the combustion chambers. In accordance with this feature of the invention, the luminosity of the gases are sensed in each of the combustion chambers and adjustments are made so as to maintain the uniformity between the luminosity in the various combustion chambers.

Yet another feature of this invention is adapted to be embodied in a method for measuring the combustion chamber pressure in an internal combustion engine by measuring the luminosity within the combustion chamber.

Still another feature of this invention is adapted to be embodied in a method for measuring the maximum heat release within the combustion chamber of an internal combustion engine by measuring other than the cylinder pressure.

A still further feature of the invention is adapted to be embodied in a system for measuring the air/fuel ratio within the combustion chamber of an internal combustion engine by measuring the luminosity of the gases during combustion and thereafter.

A still further feature of this invention is adapted to be embodied in a method for measuring the indicated mean effective pressure within the combustion chamber of an engine by measuring a parameter other than pressure within the combustion chamber.

BRIEF DESCRIPTION OF THE DRAWINGS

The single FIGURE of drawings illustrates a cross-sectional view taken through a single combustion chamber of a multiple cylinder internal combustion engine constructed, measured and operated in accordance with the embodiments of the invention.

DETAILED DESCRIPTION OF THE PREFERRED EMBODIMENTS

Referring to the single FIGURE of the drawings, a multiple cylinder internal combustion engine is identified generally by the reference numeral 11. It is to be understood that, although the invention has particular utility in multiple cylinder engines, certain facets of the invention may find application in single cylinder engines. Also, although the invention is described in conjunction with a reciprocating type engine, the principles of the invention may be utilized with engines of the non-reciprocating, such as rotary, type and with engines operating on either two stroke or four stroke cycles.

Inasmuch as the invention is directed primarily with the combustion chamber and the conditions therein, only a cross-sectional view taken through one of the combustion chambers is believed to be necessary to understand the invention. This cross-sectional view shows a cylinder block 12 having a cylinder bore 13 in which a piston 14 is supported for reciprocation. The piston 14 is connected by means of a connecting rod (not shown) to a crankshaft for providing output power from the engine.

A cylinder head 15 is affixed in a known manner to the cylinder block 12 and has a recess 16 which cooperates with the cylinder bore 13 and head of the piston 14 to provide a chamber of variable volume, sometimes referred to hereinafter as the combustion chamber.

An intake port 17 and an exhaust port (not shown) extend through the cylinder head 15 and have their communication with the combustion chamber 16 controlled by poppet type intake and exhaust valves (not shown) for admitting a charge to the combustion chamber 15 and for discharging the burnt charge from the combustion chamber.

The charge admitted to the combustion chamber 16 may comprise pure air or a fuel/air mixture that is formed by a suitable charge former such as a port or throttle body type fuel injector or carburetor. Alternatively, if pure air is injected, direct cylinder injection may employed for injecting fuel into the combustion chamber 16 to form the fuel/air mixture. The fuel/air ratio may be controlled in any of a wide variety of known manners such as by means of throttle valves, fuel control valves, injection duration, injection timing, etc. Although an important feature of the invention is the parameters under which the fuel/air ratio are controlled, the actual physical hardware for adjusting the fuel/air ratio forms no part of the invention.

The engine 11 may be of the diesel or spark ignited type but the types of controls exercised and the nature of luminosity sensing may vary with the engine type. The following discussion is concerned primarily with a spark ignited engine. If the engine 11 is of the diesel type, combustion is initiated through the timing of the direct cylinder fuel injection or in any of the other known manners normally employed in connection with diesel engines. If, on the other hand, the engine 11 is of the spark ignited type, a spark plug will be carried in the cylinder head 15 and have its gap exposed in the combustion chamber 16. The spark timing is controlled by a suitable mechanism which may be of any conventional type; however, the timing of the spark firing can be varied in accordance with parameters, hereinafter to be described.

As has been previously noted, the invention is capable of embodiment in any of a wide variety of conventional types of internal combustion engines and, for that reason, the details of the engine construction are not necessary to understand how the invention can be practiced by those skilled in the art. However, in accordance with the invention there is provided in the combustion chamber 16 a luminosity detector, indicated generally by the reference numeral 18. The luminosity detector 18 includes a fiber optic probe 19 or other types of optical access which extends through the cylinder head 15 and has its end terminating at the combustion chamber 16. Although the fiber optic probe 19 may be of any type, a high temperature glass bundle consisting of boresilicate clad crown glass which exhibits nearly flat spectral response in the range to be sensed has been found to be particularly advantageous. A probe having a diameter of 0.06 inches has teen found to be practical and makes it relatively easy to install the cylinder head.

The fiber optic probe 19 is held in place by means of a compression fitting and has its outer end disposed within a light sealed housing 22 in proximity to a detector 23. It has been found that the type of detector 23 which is employed will depend to some extent on the parameters to be measured. Specifically, the type of detector will depend to a large extent upon the gas or gases whose emission is to be measured within the cylinder.

A wide variety of emissions from the glowing gases in the chamber can be measured and specifically those which have been found to be of particular importance are OH emissions, CH emissions, $C_2$ emissions and/or $H_2O$ emissions. As will be noted hereinafter, the type of detector employed for the specific emissions will vary. However, if working primarily with $H_2$ emissions there is a stronger signal and it is possible to employ a less expensive detector such as a silicon photo detector.

Also, it may be desirable to provide a monochromator or an optical filter in front of the detector so as to select the desired wavelength of light which is being measured. If OH emissions are being measured, the wavelength should be 311.0 nm (+/−10 nm). If CH emissions are being measured, the desired wavelength is 431.5 nm (+/−10 nm). If $C_2$ emissions are measured, then the desired wavelength is 516.5 nm (+/−10 nm). When $H_2O$ emissions are being measured, the wavelength should be 927.7 nm (+/−20 nm). These figures are exemplary only and various modifications may be employed within the scope of the invention.

In one application the detector 23 specifically had a peak response of 0.74 microns with a fifty percent band width of 0.08 microns, although other types of detectors can be utilized depending upon the type of fiber optic probe employed. The detector 23 is connected to a remotely positioned computer control unit by means of conductors 24.

In addition to the provision of the luminosity signal from the detector 23, the remotely positioned apparatus may measure certain engine parameters also may receive input signals from other sensors normally employed on the engine, for example intake manifold pressure and temperature, engine speed, and spark timing angle. As has been noted, these types of sensors are normally employed with modern internal combustion engines and their signals can be processed in a manner as to be described in conjunction with the luminosity signal to provide certain measured characteristics of the engine operation.

The remotely positioned control unit may be any suitable type and is particularly adapted to transmit the signal from the detector 23 into an output indicative of luminosity within the combustion chamber 16. As has been noted, various luminosity spectra may be detected or merely a total luminosity signal may be read. As also has been noted, it has been found that certain constituents of the glowing gases in the combustion chamber 16 glow at different spectral ranges and this may be utilized to sense the amount and condition of such components in the combustion chamber 16 during each cycle of operation.

It has been discovered that a wide variety of combustion phenomena and other characteristics can be determined by the luminosity probe 18 and the signals employed to adjust the parameters of the engine to obtain optimum performance. For example, the luminosity signal is a signal which gives a very good indication of the start of combustion. Thus, unlike cylinder pressure or other parameters, the luminosity signal clearly defines the actual start of combustion.

Therefore, the output of the luminosity probe 18 may be employed to control spark timing or injection timing in a diesel engine so as to control when combustion begins to obtain optimum performance characteristics. The control circuitry and mechanism for adjusting either spark timing or the initiation of injection in a diesel engine in response to this signal are believed to be well within the scope of those skilled in the art once they understand that the luminosity signal is indicative of the start of combustion and also that this signal can be used so as to control the beginning of combustion. Also, the duration of the signal can be utilized to determine the amount of fuel which has been or should be injected or introduced into the cylinder from a carburetor or port type injector so as to obtain the desired burn time.

One other engine characteristic which is found to have a correlation between the maximum luminosity is the cylinder pressure and the relationship between cylinder pressure at crank angles and luminosity at crank angles. This has been found to be particularly easy to measure when dealing with the emissions of H₂O. By using a quadratic curve fit, it has been possible to develop an empirical model that correlates the data over all the engine operating conditions. This includes specifically engine speed and intake manifold pressure. It has also been found that correlation can be obtained, although not quite as good, using engine speed and spark timing.

In addition to being able to obtain the aforenoted data, it is therefore possible to obtain the maximum cylinder pressure and the crank angle at which it occurs. Therefore, it is actually possible to measure cylinder pressure within the combustion chamber on a cycle to cycle basis without employing the pressure transducer devices of the type previously employed for this purpose.

The advantage of being able to eliminate the use of a pressure transducer is that the temperature variability of such devices is avoided and it is not necessary to convert the pressure signal into an electrical signal which must then be transmitted to the remotely positioned components. By having to transmit an electrical signal, there becomes the disadvantage that the electrical signal may be upset by external noise that exists within the engine and particularly caused by the other electrical noises generated in the engine.

In addition to the beginning and ending of combustion and cylinder pressure, the luminosity signal also provides an indication of heat release and may also be employed so as to control the beginning of combustion and/or the amount of fuel introduced so as to provide the desired heat release and timing cycles. It has been noted that peak luminosity and maximum rate of heat release are substantially the same and hence the engine parameters may controlled in conjunction with the luminosity signal to provide the desired rate of heat release.

The heat release can be measured and has been found to correlated to engine load and engine speed. In order to obtain this correlation, an empirical model can be formed from a quadratic equation and measuring H₂O emissions. The characteristics of engine speed, spark timing, intake manifold pressure and intake manifold temperature have relationship in this correlation.

It has also been noted that the luminosity signal is very sensitive to air/fuel ratio variations when all other conditions are held constant and, accordingly, the luminosity probe 18 can be used as a detector of in-cylinder air/fuel ratio for adjusting the charge former so as to provide the desired air/fuel ratio in response to any present program.

In connection with the air/fuel ratio, various other engine characteristics such as engine speed, spark timing, intake manifold pressure and intake manifold temperature enter into the calculation and it is possible to create empirical modeling employing these characteristics in order to obtain accurate data as to the maximum rate of heat release.

Furthermore, since it has been found that pressure can be measured, it is also possible to obtain actual readings of indicated mean effective pressure (IMEP) from the luminosity, particularly measuring that of CH, $CO_2$ and/or $H_2O$ and modifying it in accordance with empirical correlations involving engine speed, spark timing, intake manifold pressure and intake manifold temperature.

In addition to the aforenoted factors, such conditions as high pressure or hot cycles produce sharp luminosity signals whereas partial burn cycles produce weak luminosity signals. Complete misfire results in no luminosity signals and hence the luminosity signal may be employed so as to sense cylinder to cylinder or cycle to cycle variations and the engine parameters adjusted to minimize such variations.

It is also well known that it is difficult to operate an engine satisfactorily during transient conditions such as acceleration and deceleration. However, when it is possible to monitor the condition in the combustion chamber from cycle to cycle, the engine parameters such as spark timing, fuel control and the like can be adjusted to more quickly cope with these transient conditions.

It should be readily apparent that the use of the luminosity probe is extremely effective in sensing and measuring a wide variety of running characteristics within the combustion chamber and variations from chamber to chamber and cycle to cycle. Those skilled in the art armed with this knowledge should be able to provide the various engine controls such as the timing of the spark ignition and timing and duration of fuel injection or changing of fuel/air ratios through premixing devices such as carburetors or port injectors so as to obtain optimum performance in response to those measured characteristics mentioned and minimum cycle to cycle and cylinder to cylinder variations. For example, by measuring the maximum cylinder pressure, it is possible to phase the burning by utilizing feedback control of the spark timing to improve fuel consumption and better emission control, particularly that of NOx. In the same manner, the proper phasing of the burn rate using feedback control of spark timing can improve fuel consumption and provide better emission control as can the control of indicated mean effective pressure. The control of air/fuel ratio by feedback control of fuel flow can improve exhaust emissions and fuel consumption.

As has been previously noted, the presence of certain elements and compounds may also be sensed by sensing specific light ranges in the cylinder to obtain optimization of these factors.

The foregoing description is that of a preferred embodiment of the invention and various changes and modifications may be made without departing from the spirit and scope of the invention, as defined by the appended claims.

We claim:

1. The method of operating an internal combustion engine having a combustion chamber, means for forming a combustible fuel/air mixture within the combustion chamber and means for detecting the luminosity within the combustion chamber in the range of wave lengths about 300 nm to about 947 nm during each cycle of operating of the engine from prior to the initiation of combustion until after the completion of the combustion process, and adjusting the fuel/air ratio to maintain the desired luminosity characteristic.

2. The method of operating an internal combustion engine as set forth in claim 1 wherein the fuel/air ratio is adjusted to maintain the desired luminosity during the burning cycle.

3. The method of operating an internal combustion engine having a combustion chamber, means for providing a fuel/air mixture within said combustion chamber, means for igniting the fuel/air mixture and means for sensing the luminosity within the combustion chamber, measuring the luminosity of the gases in the combustion chamber in the range of wave lengths about 300 nm to about 947 nm during each cycle of operating of the engine from prior to the initiation of combustion until after the completion of the combustion process and adjusting the engine running condition so as to maintain the desired luminosity in relation to output shaft angle.

4. The method of operating an internal combustion engine as set forth in claim 3 wherein the desired luminosity is maintained at a maximum during the burn cycle at the desired crank angle.

5. The method of operating an internal combustion engine having a combustion chamber and means for delivering and firing a charge within the combustion chamber, said method comprising the steps of measuring the instantaneous pressure within the cylinder by sensing the luminosity of the gases within the combustion chamber within the range of wave lengths about 300 nm to about 947 nm.

6. The method of operating an internal combustion engine as set forth in claim 5 wherein the luminosity sensed in about 927 nm.

7. The method of operating an internal combustion engine having a combustion chamber and means for introducing and firing a charge within the combustion chamber, comprising the steps of measuring the heat release in the combustion chamber in relation to crank angle by measuring the luminosity of the gases in the combustion chamber in the range of wave lengths about 300 nm to about 947 nm during each cycle of operation of the engine from prior to the initiation of combustion until after the completion of the combustion process and adjusting the engine parameters to maintain the desired relationship between heat release and crank angle.

8. The method of operating an internal combustion engine as set forth in claim 7 wherein the luminosity measure is about 927 nm.

9. The method of operating an internal combustion engine having a combustion chamber and means for introducing and firing a charge within the combustion chamber, said method comprising the steps of measuring the indicated means effective pressure within the combustion chamber by sensing the luminosity of the gases within the combustion chamber in the range of wave lengths about 300 nm to about 947 nm during each cycle of operation of the engine from prior to the initiation of combustion until after the completion of the combustion process.

10. The method of operating an internal combustion engine as set forth in claim 9 wherein the luminosity sensed is about 927 mn.

11. The method of operating an internal combustion engine having combustion chamber, means for causing combustion to occur in said combustion chamber and means for sensing the luminosity in the combustion chamber in the range of wave lengths about 300 nm to about 947 nm during each cycle of operation of the engine from prior to the initiation of combustion until after the completion of the combustion process, adjusting the running of the engine to maintain uniform luminosity during successive cycles of operation of the engine.

12. The method of operating an internal combustion engine having multiple combustion chambers, means for effecting combustion within said combustion chambers, and means for sensing the luminosity in a plurality of the combustion chambers in the range of wave lengths about 300 nm to about 947 nm during each cycle of operation of the engine from prior to the initiation of combustion until after the completion of the combustion process, comprising the steps of adjusting the running of the engine to maintain uniform luminosity in the plurality of the combustion chambers.

13. The method of measuring combustion chamber pressure in an internal combustion engine comprising the steps of measuring the luminosity within the combustion chamber in the range of wave lengths about 300 nm to about 947 nm during each cycle of operation of the engine from prior to the initiation of combustion until after the completion of the combustion process, and modifying the luminosity signal in response to a predetermined relationship in order to obtain combustion chamber pressure.

14. The method of measuring combustion chamber pressure in an internal combustion engine comprising the steps of measuring the luminosity within the combustion chamber in the range of wave lengths about 300 nm to about 947 nm during each cycle of operation of the engine from prior to the initiation of combustion until after the completion of the combustion process, and modifying the luminosity signal in response to a predetermined relationship in order to obtain maximum heat release within the combustion chamber.

15. The method of measuring combustion chamber pressure in an internal combustion engine comprising the steps of measuring the luminosity within the combustion chamber in the range of wave lengths about 300 nm to about 947 nm during each cycle of operation of the engine from prior to the initiation of combustion until after the completion of the combustion process, and modifying the luminosity signal in response to a predetermined relationship in order to obtain air/fuel ratio within the combustion chamber.

16. The method of measuring means effective pressure in an internal combustion engine comprising the steps of measuring the luminosity within the combustion chamber in the range of wave lengths about 300 nm to about 947 nm during each cycle of operation of the engine from prior to the initiation of combustion until after the completion of the combustion process, and modifying the luminosity signal in response to a predetermined relationship in order to obtain means effective pressure within the combustion chamber.

17. The method of measuring the start of combustion in the combustion chamber of an internal combustion engine during a single cycle comprising the steps for sensing the luminosity within the combustion chamber in the range of wave lengths about 300 nm to about 947 nm during each cycle of operation of the engine from prior to the initiation of combustion until after the completion of the combustion process, and determining that combustion has begun when the luminosity of the gases in the combustion chamber exceeds a predetermined value.

18. The method of measuring combustion in an internal combustion engine as set forth in claim 17 wherein the duration when the luminosity exceeds a predetermined value is measured during the single cycle.

19. The method of determining the existence of the misfires in the combustion chamber of an internal combustion engine during a signal cycle comprising the steps of measuring the luminosity in the combustion chamber in the range of wave lengths about 300 nm to about 947 nm during each cycle of operation of the engine from prior to the initiation of combustion until after the completion of the combustion process, and deterring that a misfire has occurred if the luminosity signal is below a predetermined value.

* * * * *

UNITED STATES PATENT AND TRADEMARK OFFICE
CERTIFICATE OF CORRECTION

PATENT NO. : 4,940,033
DATED : July 10, 1990
INVENTOR(S) : Plee, et al It is certified that error appears in the above-identified patent and that said Letters Patent is hereby corrected as shown below:

On the Title Page under "Related U.S. Application Data",

"Continuation" should be --Continuation-in-part--.

Column 1, line 11, delete ", still pending".

Column 5, line 2, after "may" insert --be--.

Column 5, line 44, "teen" should be --been--.

Column 5, line 62, "$H_2$" should be --$H_2O$--.

Column 6, line 5, "$H_2$ O" should be --$H_2O$--.

Column 6, line 17, after "apparatus" insert --which--.

Column 6, line 26, after "be" insert --of--.

Column 7, line 35, after "may" insert --be--.

Column 7, line 39, after "to" (first occurrence) insert --be--.

Column 7, line 56, after "modeling" insert --techniques--.

Column 8, lines 42-43, "exbodiment" should be --embodiment--.

Column 9, line 20, Claim 6, "in" should be --is--.

Column 9, line 41, Claim 9, "means" should be --mean--.

Column 9, line 50, Claim 10, "927mn" should be --927nm--.

Column 10, lines 14-15, Claim 14, "combustion chamber pressure" should be --maximum heat release--.

Column 10, lines 23-24, Claim 15, "combustion chamber pressure" should be --air fuel ratio--.

UNITED STATES PATENT AND TRADEMARK OFFICE
CERTIFICATE OF CORRECTION

PATENT NO. : 4,940,033

DATED : July 10, 1990

INVENTOR(S) : Plee, et al

It is certified that error appears in the above-identified patent and that said Letters Patent is hereby corrected as shown below:

Column 10, line 33, Claim 16, "means" should be --mean--.

Column 10, line 41, Claim 16, "means" should be --mean--.

Column 10, line 60, Claim 19, "signal" should be --single--.

Column 10, line 66, Claim 19, "deterring" should be --determining--.

Signed and Sealed this

Fourteenth Day of July, 1992

Attest:

DOUGLAS B. COMER

Attesting Officer

Acting Commissioner of Patents and Trademarks